(12) United States Patent
Lange et al.

(10) Patent No.: US 7,181,055 B2
(45) Date of Patent: Feb. 20, 2007

(54) SYSTEMS AND METHODS FOR REGISTERING REFLECTANCE AND FLUORESCENCE HYPERSPECTRAL IMAGERY

(76) Inventors: Holger Lange, 44-145-5 Laha St., Kaneohe, HI (US) 96744; Ulf Peter Gustafsson, 1720 Ala Moana Blvd. #807B, Honolulu, HI (US) 96815

( * ) Notice: Subject to any disclaimer, the term of this patent is extended or adjusted under 35 U.S.C. 154(b) by 717 days.

(21) Appl. No.: 10/895,440

(22) Filed: Aug. 15, 2003

(65) Prior Publication Data
US 2005/0111758 A1    May 26, 2005

(51) Int. Cl.
G06K 9/00    (2006.01)

(52) U.S. Cl. .................. 382/128; 382/131; 382/284; 382/294

(58) Field of Classification Search ............ 382/128, 382/131, 284, 294; 356/326
See application file for complete search history.

(56) References Cited

U.S. PATENT DOCUMENTS

| | | | |
|---|---|---|---|
| 7,020,313 B2* | 3/2006 | Declerck et al. | 382/128 |
| 7,062,078 B2* | 6/2006 | Weese et al. | 382/131 |
| 7,106,891 B2* | 9/2006 | Wyman et al. | 382/128 |
| 7,110,587 B1* | 9/2006 | Natanzon et al. | 382/131 |

* cited by examiner

Primary Examiner—Bhavesh M. Mehta
Assistant Examiner—John Strege
(74) Attorney, Agent, or Firm—Martin E. Hsia

(57) ABSTRACT

The image registration systems and methods according to this invention register reflectance and fluorescence hyperspectral imagery and provide the spatial image transformation between the reflectance and fluorescence hyperspectral imagery. A reflectance image is embedded into the fluorescence hyperspectral imagery and thereby resolves the resemblance problem of reflectance and fluorescence hyperspectral imagery. The reflectance image is embedded into the fluorescence hyperspectral imagery using (1) light from a narrow-band source embedded in Ultraviolet (UV) excitation light, (2) second order diffracted light, and/or (3) Ultraviolet (UV) excitation light reflectance. Resembling reflectance images are calculated from the reflectance hyperspectral imagery and the embedded reflectance image in the fluorescence hyperspectral imagery. The two respective reflectance images are pre-processed to maximize the resemblance between them. Image registration algorithms use the two pre-processed reflectance images and calculate the spatial image transformation that allows to map the spatial coordinates from the reflectance to the fluorescence hyperspectral imagery (and vice versa).

1 Claim, 4 Drawing Sheets

SYSTEMS AND METHODS FOR REGISTERING REFLECTANCE AND FLUORESCENCE HYPERSPECTRAL IMAGERY

REFERENCES CITED

OTHER REFERENCES

[Brown 1992] Brown, L. G.; A survey of image registration techniques; ACM Computing Survey, 24 (4): 325–376, 1992.
[Hill 2001] Hill D. L. G., Batchelor P. G., Holden M. H. and Hawkes D. J.; Medical Image Registration; Phys. Med. Biol., vol 46, no. 1, pp. 1–45; 2001.
[Lester 1999] Hava Lester, Simon R. Arridge. A survey of hierarchical non-linear medical image registration. Pattern Recognition vol 32, pp 129–149, 1999.
[Maurer 1993] Maurer C. and Fizpatrick J. M.; A review of medical image registration; Interact. Image-Guided Neurosurg., pp. 17–44, 1993.
[Maintz 1998] Maintz, J. B. A. and Viergever M. A.; A survey of Medical Image Registration"; Medical Image Analysis, vol. 2, p. 1–36; 1998.
[Rohr 2000] Rohr, K.; Elastic Registration of Multimodal Medical Images: A Survey; Kunstliche Intelligenz, Heft 3/00, ISSN 0933–1875, arenDTaPVerlag, Bremen; 2000.
[van den Elsen 1993] van den Elsen P. A., Pol E.-J. D., and Viergever M. A.; Medical image matching—A review with classification; IEEE Eng. Med. Biol., vol.12, no. 2, pp. 16–39; 1993.
[West 1997] West J, Fitzpatrick J M, Wang M Y, Dawant B M, Maurer C R, Kessler R M, Maciunas R J, Barillot C, Lemoine D. Collignon A, Maes F, Suetens P, Vandermeulen D, van den Elsen P, Napel S, Sumanaweera T S, Harkness B, Hemler P F, Hill D L G, Hawkes D J, Studholme C, Maintz J B A, Viergever M A, Malandain G, Pennec X, Noz M E, Maguire G Q, Pollack M, Pelizzari C A, Robb R A, Hanson D, Woods R P. Comparison and evaluation of retrospective intermodality brain image registration techniques. Journal of Computer Assisted Tomography; 21: 554–566; 1997.

FIELD OF INVENTION

This invention generally relates to medical imaging. The invention relates more specifically to the registration of multi-modal imagery obtained from reflectance and fluorescence hyperspectral imaging devices.

BACKGROUND OF THE INVENTION

Hyperspectral imaging is being introduced in a new medical imaging modality for the early and consistent detection of uterine cervical, colorectal, dermatological, esophageal and oral cancer. Hyperspectral refers to the instruments' ability to collect 20 to 30 times the color information as compared to a standard camera. This allows for discrimination between spectral features not normally available to a physician.

In hyperspectral imaging an entire scene is being imaged in a large number of spectral bands. The hyperspectral imaging device in this invention utilizes a technique called push-broom scanning. The hyperspectral sensor uses a progressive line scan to capture an entire image. For each scan line, the full spectrum for every pixel is provided. By taking a series of lines, a hyperspectral cube is developed. This hyperspectral cube contains spatial information in two dimensions (pixels) and spectral information in the third dimension.

Over the last decade, several groups have investigated the potential use of fluorescence and reflectance spectroscopy to detect neoplasia. Spectroscopic methods identify neoplasia by detecting biochemical and tissue architectural changes that are hallmarks of malignant transformation. Fluorescence spectroscopy detects endogenous fluorescent indicators of cellular metabolism, including NAD(P)H and $FAD^+$, and pre-invasive changes to the connective tissue stroma, such as digestion of fluorescent collagen cross-links. Both reflectance and fluorescence spectroscopy can detect angiogenic changes, due to the spectral characteristics of hemoglobin.

Reflectance and fluorescence are two different modes of light interaction with matter. Reflectance is an elastic interaction process which means that there is no change in energy of the incident and the emitted light, while fluorescence is an inelastic interaction process which results in the emission of light with an energy different from that of the incident light. In reflectance mode, the tissue is illuminated using a broadband white light source in the visible light spectrum, and detects the reflected intensity in the same spectral region. In fluorescence mode, the tissue is excited with narrowband Ultraviolet (UV) light and collects fluorescence in the visible spectral region.

The calculation of intrinsic fluorescence, the "pure" fluorescence, requires the spatial registration of the reflectance and fluorescence hyperspectral imagery.

Advanced computer algorithms to diagnose pre-cancerous and cancerous tissue regions utilize the fusion of multiple data sources, including the reflectance and fluorescence hyperspectral imagery, to optimize their performance. A key enabling technology for the data fusion is the registration of the different data sources.

Using a push-broom scanning technology, the hyperspectral bands are already aligned to each other and only the two spatial dimensions of the hyperspectral imagery needs to be registered. The two spatial dimensions can be represented by a 2D image from a single band or a 2D image calculated from any number of bands.

The image registration of two images involves the matching of features present in both images, and from their spatial relationships the calculation of the image transformation between them.

The fluorescence and reflectance hyperspectral imagery by their nature exhibit different features. The ambiguity in multi-modal image registration, due to the different features present in the images, typically only allows to do image registration using an affine image transformation (rotation, translation and scale). Unfortunately, between the fluorescence and reflectance hyperspectral data acquisition the patient and in particular the body part under examination may have moved. This is soft tissue movement that cannot be described with an affine image transformation and requires a general (elastic) warp image transformation.

The amplitude of this movement and therefore the need for registration can be minimized or even eliminated by minimizing the time between the acquisition of the fluorescence and reflectance hyperspectral imagery for a given pixel (spatial location). This can be achieved with a system design collecting the fluorescence and reflectance hyperspectral imagery in a scan-line interleaved manner. For each scan-line the fluorescence and reflectance hyperspectral data is acquired before moving to the next scan-line.

A different system design, considered in this invention, collects the fluorescence and reflectance hyperspectral imagery in a sequential manner; one complete hyperspectral data set after the other, allowing for more ample tissue movement and requiring robust image registration.

The invention provides systems and methods to embed a reflectance image in the fluorescence hyperspectral data, allowing the image registration of fluorescence and reflectance hyperspectral imagery to use a general (elastic) warp image transformation. By embedding a reflectance image into the fluorescence hyperspectral imagery, both data sets now have a resembling reflectance image. This resolves the ambiguity of the image registration and the data sets can be registered using a general (elastic) warp image transformation taken into account the soft tissue movement.

The invention is not limited to any particular image registration algorithm but rather foresees the use of any image registration algorithm that is appropriate for the targeted application. General surveys [Brown 1992], [Maurer 1993], [van den Elsen 1993], [West 97], [Maintz 1998], [Lester 1999], [Rohr 2000] and [Hill 2001] provide an extensive list of suitable algorithms that can be used.

SUMMARY OF THE INVENTION

This invention provides systems and methods to register reflectance and fluorescence hyperspectral imagery.

The invention separately provides systems and methods that embed a reflectance image in the fluorescence hyperspectral imagery.

These and other features and advantages of this invention are described in or are apparent from the following detailed description of the preferred embodiments.

BRIEF DESCRIPTION OF THE DRAWINGS

The preferred embodiments of this invention will be described, with reference to the following figures, wherein.

DETAILED DESCRIPTION OF PREFERRED EMBODIMENTS

The systems and methods described in this invention enable the spatial registering of reflectance and fluorescence hyperspectral imagery.

The problem of this registration task is the poor resemblance of reflectance and fluorescence hyperspectral imagery that makes it difficult to match features in both data sets to calculate the spatial transformation between them. This problem, typical for multi-modal image registration tasks, affects the robustness of the registration and restricts the complexity of the spatial transformation supported by the registration process to an affine transformation (rotation, translation and scale). Affine transformations are too simple for medical imaging applications where soft tissue movement requires more complex transformations like elastic transformations.

The systems and methods described in this invention provide the enabling technology to overcome the poor resemblance problem by using a reflectance image embedded into the fluorescence hyperspectral imagery for the registration process and thereby proving a robust registration that supports complex spatial transformations.

The systems and methods described in this invention assume a push-broom, line scanning technology, however, the same processes could be applied to an area imaging system. In the line scanning approach, the hyperspectral bands are already aligned to each other and only the two spatial dimensions of the hyperspectral imagery needs to be registered. The two spatial dimensions can be represented by a 2D image from a single band or a 2D image calculated from any number of bands.

The systems and methods described in this invention show three means by which a reflectance image can be embedded into the fluorescence hyperspectral imagery:

(1) Light from a narrow-band source embedded in Ultraviolet (UV) excitation light, (2) Second-order diffracted light, and (3) Ultraviolet (UV) excitation light reflectance.

Figure 1:
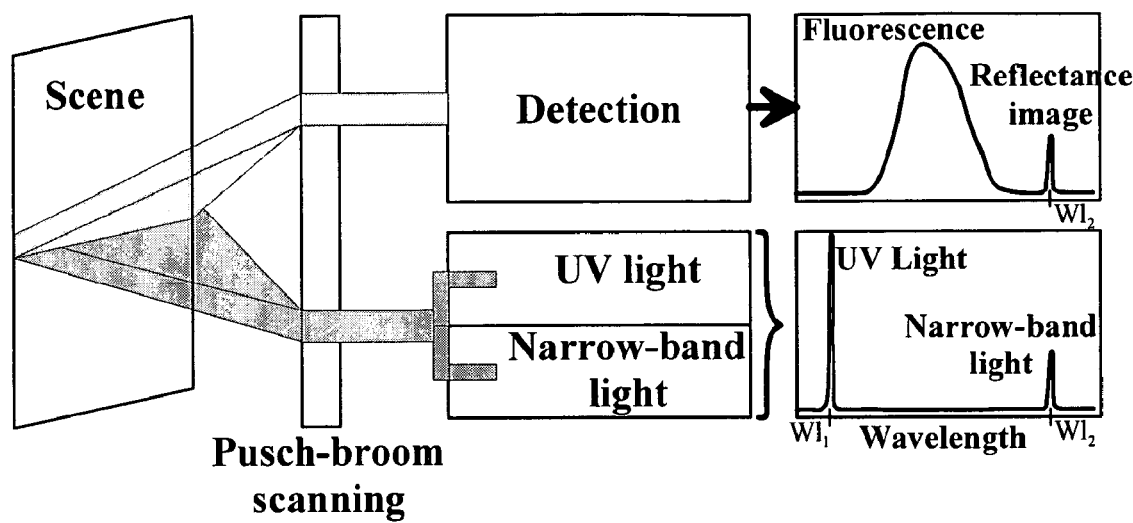
FIG. 1 is a block diagram of one exemplary embodiment of a hyperspectral imaging devices that embeds a reflectance image into the fluorescence hyperspectral imagery by using light from narrow-band source embedded in Ultraviolet (UV) excitation light according to this invention.

FIG. 1 shows the block diagram of a hyperspectral imaging devices that embeds a reflectance image into the fluorescence hyperspectral imagery by using light from a narrow-band source embedded in Ultraviolet (UV) excitation light.

In approach 1, the tissue is illuminated by the Ultraviolet (UV) light and a narrow band light source centered in the upper visible spectrum where almost no fluorescence intensity is present. Both the Ultraviolet (UV) light and the light source illuminate the tissue during the hyperspectral scan and the hyperspectral imaging device collects both the fluorescence and the reflected light. The reflected light is seen as a narrow peak in the fluorescence spectrum. The light from the narrow-band source might induce fluorescence in the tissue as well but as fluorescence is an in-elastic scattering process, this fluorescence light will be emitted at even longer wavelengths.

Approach 2 and 3 both use the Ultraviolet (UV) excitation light to embed a reflectance image in the fluorescence hyperspectral imagery. The ultraviolet light will excite tissue fluorescence but the light will also be reflected.

Figure 2:
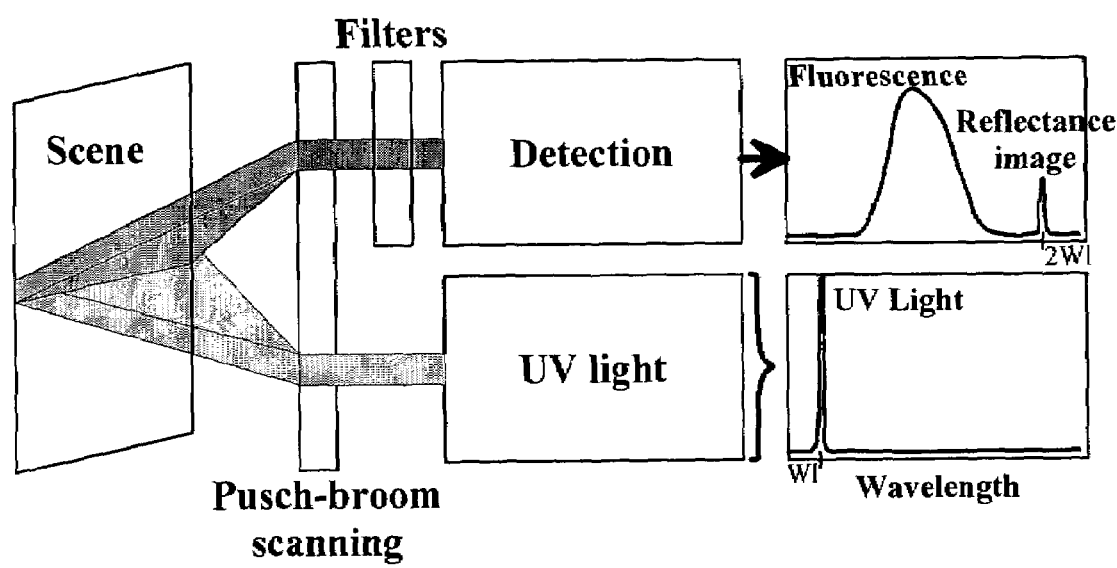
FIG. 2 is a block diagram of one exemplary embodiment of a hyperspectral imaging devices that embeds a reflectance image into the fluorescence hyperspectral imagery by using second-order diffracted light according to this invention.

FIG. 2 shows a block diagram of a hyperspectral imaging devices that embeds a reflectance image into the fluorescence hyperspectral imagery by using second-order diffracted light.

The hyperspectral imaging device provides spectral information using a diffractive grating. Every diffractive optical element share a common feature in that it will diffract light in what is called different orders, first, second, third, etc. This means that light of the same wavelength will be diffracted in different angles depending on the order. It also means, due to the regular profile of a typical grating, that a grating will diffract the second-order light and the first-order into the same angle. That light at multiple wavelengths will overlap are often an undesirable side effect of diffractive gratings but can be avoided by adding a so called order sorting filter. This effect is used in approach 2, by embedding the second-order reflected Ultraviolet (UV) light in the fluorescence hyperspectral imagery. As almost no fluorescence intensity is present at this wavelength, the information contained in the fluorescence data will not be compromised.

Figure 3:
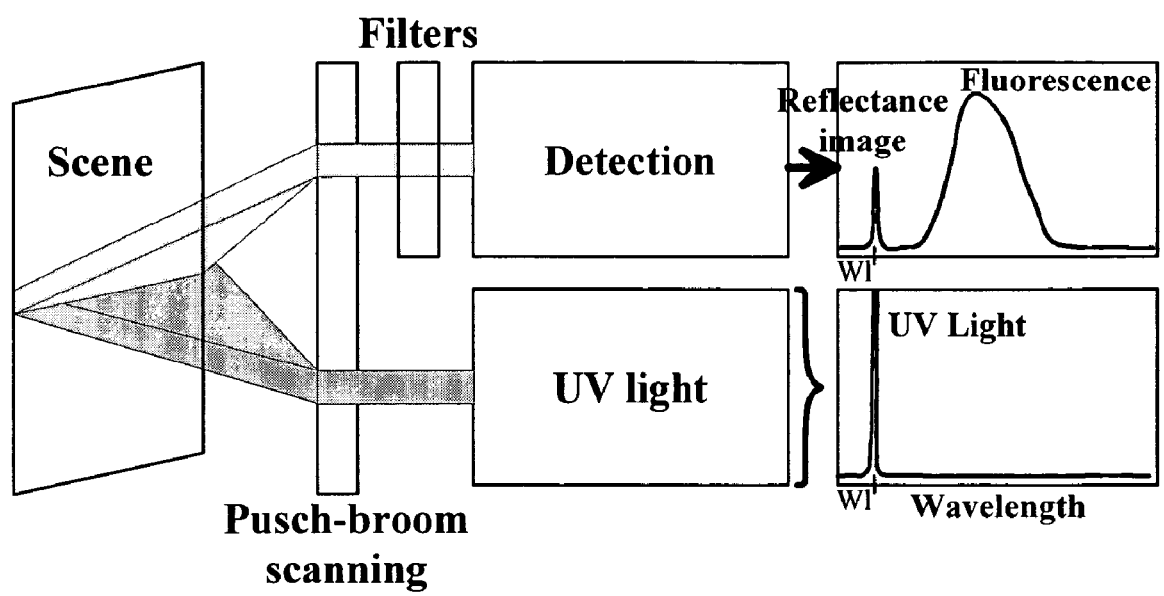
FIG. 3 is a block diagram of one exemplary embodiment of a hyperspectral imaging devices that embeds a reflectance image into the fluorescence hyperspectral imagery by using Ultraviolet (UV) excitation light reflectance according to this invention.

FIG. 3 shows a block diagram of a hyperspectral imaging devices that embeds a reflectance image into the fluorescence hyperspectral imagery by using Ultraviolet (UV) excitation light reflectance.

In approach 3, the reflected ultraviolet light is collected in a band centered around its excitation wavelength. The fluorescence information will not be compromised as no fluorescence light is present at the same wavelength as the excitation light.

One challenge is to balance the fluorescence and the reflectance intensities. If the intensities are not balanced, the reflectance image will either be too bright (saturated) or too dark (noisy) making it impossible to accurately register the fluorescence and reflectance hyperspectral data. The balancing of the fluorescence and the reflectance intensities can be addressed with the use of proper filters.

Figure 4:
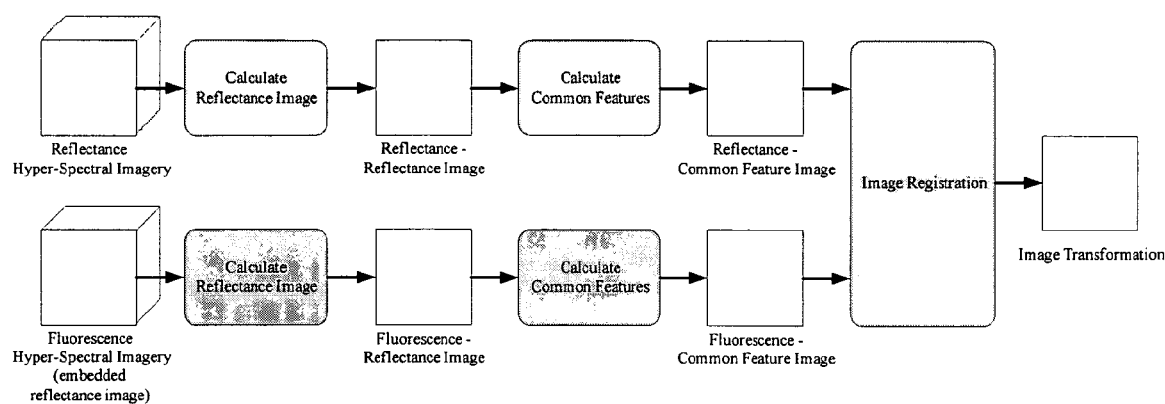
FIG. 4 is a block diagram outlining one exemplary embodiment of a reflectance and fluorescence hyperspectral imagery registration system according to this invention.

FIG. 4 shows the block diagram of the registration system. The reflectance hyperspectral imagery and the fluorescence hyperspectral imagery with the embedded reflectance image are used as the inputs. First, reflectance images from the respective hyperspectral imagery are calculated. The goal of this task is to combine the reflectance spectral information of the different bands to form the reflectance images respectively that provide the best resemblance and quality. Quality can be defined in terms of signal to noise ratio, number of features, localization of features, etc. Second, a pre-processing process for the image registration transforms the reflectance images into a common feature representation. This process is compensating for differences in the acquisition process of the reflectance images, like the different light conditions. Gradient calculations are typical for this processing step. The implementation of those processes will depend on the specific system design chosen for any particular target application. The image registration process in not limited to any particular image registration algorithm but rather foresees the use of any image registration algorithm that is appropriate for the targeted application.

What is claimed is:

1. A process for registering a fluorescence image and a reflectance image comprising:
   acquiring a fluorescence image;
   simultaneously embedding an embedded reflectance image in said fluorescence image whereby an embedded reflectance image is embedded in said fluorescence image;
   acquiring a separate reflectance image;
   comparing said embedded reflectance image and said separate reflectance image to select common features;
   transforming at least one of said reflectance images to register said common features between said reflectance images;
   whereby said fluorescence image and said separate reflectance image are registered.

* * * * *